W. B. GODDARD.
ILLUMINATING MIRROR.
APPLICATION FILED MAR. 13, 1914.

1,138,552.

Patented May 4, 1915.
2 SHEETS—SHEET 1.

Witnesses
E. Andeesen Jr.
C. C. Hines.

Inventor
W. B. Goddard,
By Victor J. Evans
Attorney

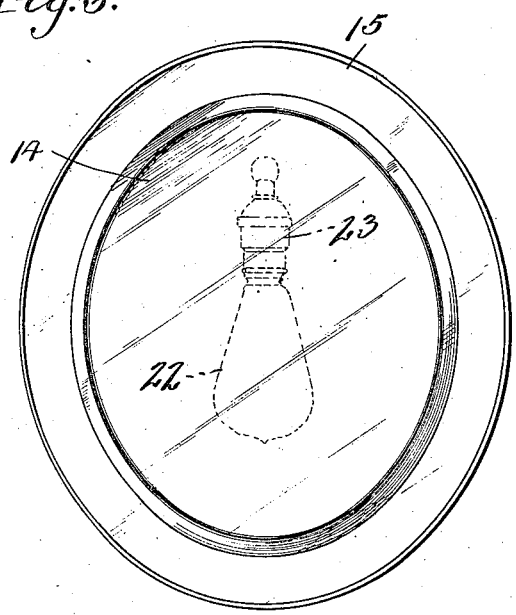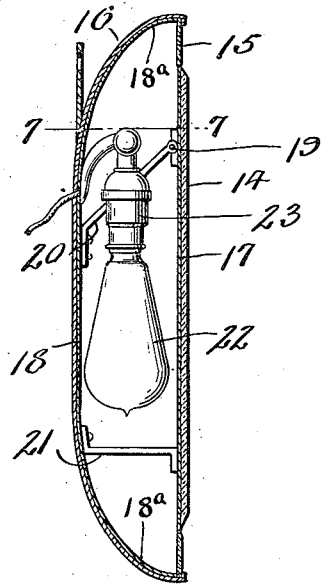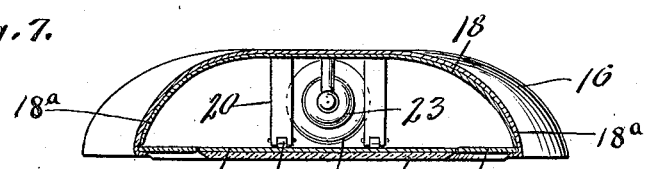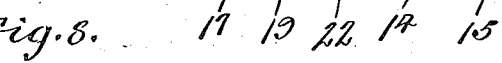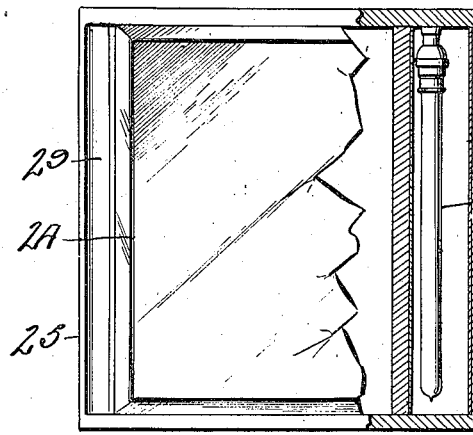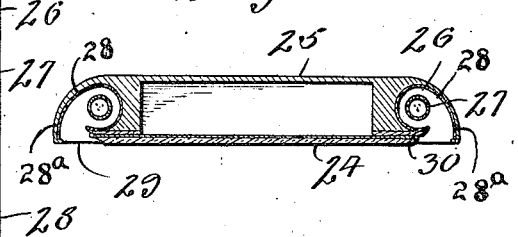

UNITED STATES PATENT OFFICE.

WILFRED B. GODDARD, OF CLEVELAND, OHIO.

ILLUMINATING-MIRROR.

1,138,552.  Specification of Letters Patent.  Patented May 4, 1915.

Application filed March 13, 1914. Serial No. 824,502.

*To all whom it may concern:*

Be it known that I, WILFRED B. GODDARD, a citizen of the United States, residing at Cleveland, in the county of Cuyahoga and State of Ohio, have invented new and useful Improvements in Illuminating-Mirrors, of which the following is a specification.

This invention relates to an illuminating mirror, and the main object of the invention is to provide an illuminating mirror that will reflect the lighted face or object without the source or sources of light being visible, either in the mirror or from any of its sides, and also to illuminate the entire face or object on all sides or any desired number of sides from an invisible source or sources of light in such a manner as to avoid any glare or bright concentration of rays of light on the face or object and to give an illumination that will light the face or object so that the reflected face or object will appear in its correct natural color as where under day light.

A further object of the invention is to provide an illuminated mirror which, in addition to obliterating all glare and objectionable concentration of light will project the light rays in an efficient manner and produce a soft toned light effect, so that a perfect reflection of the person or object in the mirror will be produced.

A still further object of the invention is to provide an illuminated mirror in which the light tones may be graded according to the character of source of light employed, by the use of tinted bulbs, shades, glass panels, globes or any transparent or translucent materials of correct tones for the purpose of modifying or correcting the illumination, so that the face or object will appear as natural as under day light, such light corrective or complemental tone agencies serving to give a correct and pleasing light tone and illumination, without absorbing, diffusing or obstructing the passage of the light rays and causing imperfect reflections.

A still further object of the invention is to provide an illuminated mirror which may be embodied in various forms for various uses, and which may also be employed as an illuminating agent for illuminating a room or other apartment by an indirect light of a soft and mellow tone.

The invention consists of the features of construction, combination and arrangement of parts herein fully described and claimed, reference being had to the accompanying drawings in which:—

Figure 1:
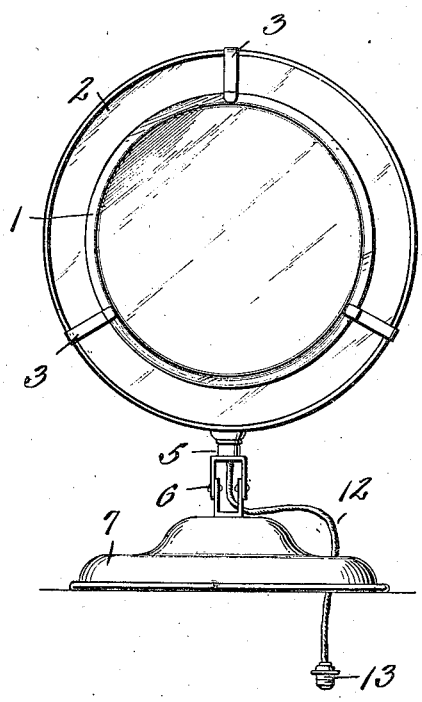
Figure 2:
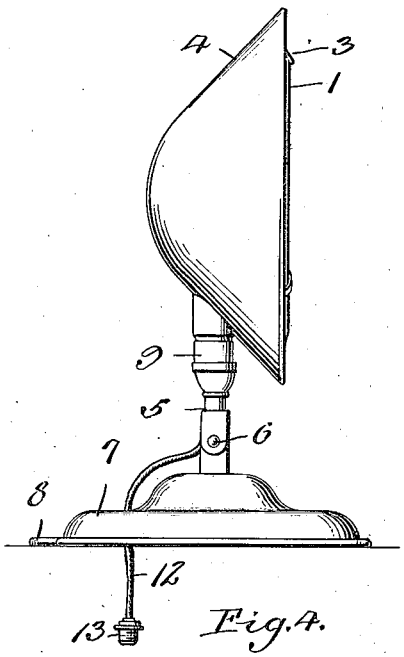
Figure 3:
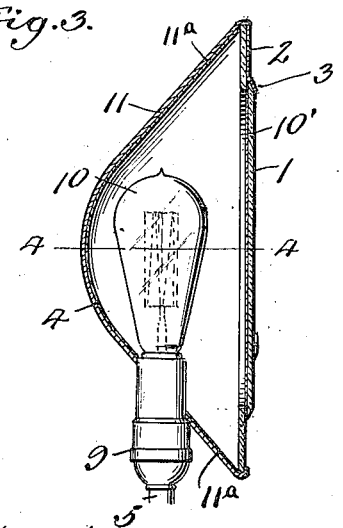
Figure 4:
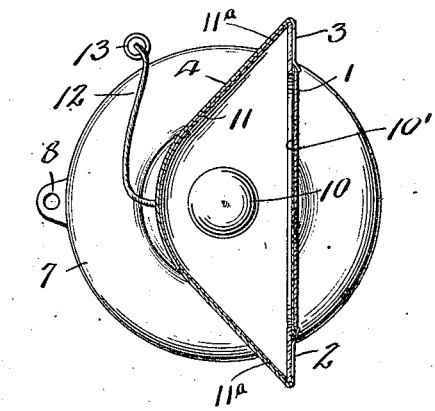

Figure 1 is a front elevation showing the embodiment of the invention in a portable illuminated mirror and lamp. Fig. 2 is a side elevation of the same. Fig. 3 is a vertical section taken centrally from front to rear through the device. Fig. 4 is a horizontal transverse section on the line 4—4 of Fig. 3. Fig. 5 is a front elevation showing the embodiment of the invention in an oval mirror designed to reflect the light rays uniformly from all sides. Fig. 6 is a central vertical front to rear section thereof. Fig. 7 is a horizontal transverse section on the line 7—7 of Fig. 6. Fig. 8 is a front elevation, partly broken away and in section, of a square or other similarly shaped mirror designed for reflecting the light rays from opposite sides thereof. Fig. 9 is a horizontal transverse section thereof.

Referring to Figs. 1 to 4, inclusive, 1 designates a mirror of oval or other suitable form, which is surrounded by a transparent or translucent light transmitting or diffusing surface 2, said mirror being detachably secured to said transmitting surface by suitable fastenings 3. The transmitting surface 2 is carried by a casing or housing 4 mounted upon a suitable standard or upright 5, hinged or pivoted, as at 6, to a base 7, so that the mirror and casing may be tilted to different desired angles. The base 7 is preferably loaded or weighted so as to support the mirror firmly and solidly in position and may be formed to rest upon a table, stand or other supporting surface, and if desired may be provided with an eye 8, by which the device as a whole may be suspended upon a wall or other vertical surface, in which event the joint 6 allows the reflector to be turned or tilted to a proper angle for use. It is to be understood that the base 7 may be of any suitable structure to adapt the device for use as a fixed or portable standing or hanging light. The standard 5 includes a socket 9 to receive an incandescent electric lamp 10 inclosed within the casing and which constitutes the source of light whereby the mirror is illuminated. Upon detaching the mirror, access to the interior of the casing may be obtained for the purpose of cleaning the interior parts or substituting a new lamp for a burnt out one when occasion requires.

The back of the mirror is provided with a light reflecting surface 10′, while the inner face of the casing or housing 4 forms or is provided with a concaved reflecting surface 11 having a marginal portion 11ª projecting beyond and surrounding the mirror and arranged in such a position as to throw the light at an inward and forward angle across the front of the mirror, the arrangement of said reflecting surface being such that the light reflected back of the mirror from reflecting surface 10' and the light reflected from the surface 11 will be transmitted through the surface 2 around all sides of the mirror upon the face of the person or the object whose reflection is to be viewed in the front of the mirror. In practice, the casing or housing 4 may be made of metal, glass or other suitable material. When made of any material, the reflecting surfaces 11, 10 may be formed by the material itself or by a coating of some suitable high grade reflecting substance, such as enamel, and the back reflecting surface 10' of the mirror when the casing is made of opaque material is also in practice made of some suitable high grade reflecting material, so that practically all the light rays will be transmitted through the transparent or translucent surface 2. Where the casing or housing is made of glass or other transparent or translucent material, the lost rays of light passing therethrough (and not projected through the surface 2) from the interior reflectors may be employed to illuminate the room or apartment in which the mirror is arranged, whereby an indirect, soft toned illumination will be secured.

The surface 2 is made of glass or other suitable material of a subdued color such as a mat color, which may vary in tone or shade according to the color of the source of light, but which in any event will transmit the undiffused light in a soft, mellow tone, free from glare and other objections, and in such manner that a correct reflection of the image will appear in the mirror. By using a surface 2 of this color, or any of its shades, the intensity of the light is subdued, without depriving it of any of its illuminating qualities, the objectionable light rays only being filtered out, and at the same time the reflected light will correctly transmit the proper color tones of the image to the mirror, unlike diffusing reflectors of ground glass or like materials, which not only transmit a large proportion of the high lights but also reduce the volume of illumination. The tone of the mat color may vary, as stated, according to the color of the light from the lamp or source of illumination, which may be corrected with relation to the surface 2 by employing any agents, such as tinted globes, shades, or any of the previously mentioned ones. Where the light from the source is of a strong cold character, the mat tint of the surface 2 or other correcting agents should be of a warm tone, whereas when the light from the source is of strong warm color, the surface 2 or correcting agents should be cold in color. Warm colors apply to shades of red, yellow and orange. Cold colors apply to shades of white, blue, green and purple. By these tonal corrections a mellow light of absolutely correct tone and of pleasing character may be produced, greatly adding to the clearness and naturalness of the image reflected in the mirror, as well as to the beauty of the illumination.

The light tones supplied from the source of light, and modified in any of the ways described, may be termed corrective or complemental rays or light tones, as these rays or tones are modified by the color tone of the surface 2 so that a conjoint action is produced to provide a soft and mellow light of the character defined.

It will be observed that the rays reflected from the surface 18 are transmitted through the surface 2 at a proper angle to converge upon the object to be viewed and so as to give a light of uniform volume or strength at all points upon the face of the mirror, thus avoiding all shadows or darkened effects. While the surface 2 is preferably employed in the marginal space between the mirror and reflector 11—11ª, it is obvious that, for sake of cheapness of construction, said surface 2 may be omitted, in which event the surface 11ª will reflect or transmit the light against the object to be viewed in the mirror.

As shown, the lamp socket connects with a lamp cord 12 which extends through the base 7 and is provided with a connecting plug 13 by which the conductor 12 may be tapped into an electric light circuit in any portion of a house or building.

It will be apparent that the device constructed as described may be used as a portable mirror of the standing or hanging variety, and by removing the mirror 1 may also be employed as a portable standing or hanging lamp.

In the form of my invention, illustrated in Figs. 5, 6 and 7 I have shown an oval or analogous type of illuminating mirror of a type which may be supported upon a wall, built into a wall, stood on tables, shelves or standards, set within the top of a table, or arranged otherwise for use or ornamentation. In this construction the mirror 14 is surrounded by a transmitting surface 15 corresponding to the surface 2, and which is carried by a suitable casing or housing 16, which may be constructed similarly to the casing or housing 4, except that it is properly shaped to adapt it to the contour of mirror 14 employed. The mirror 14 in this form of invention is provided with a rear reflecting surface 17 and the casing with a reflecting surface 18 having an angularly disposed marginal portion 18$^a$, which serve the same function as the reflecting surfaces 10′ and 11—11$^a$ previously described. In the oval type, however, I preferably hinge the mirror as at 19, to upper bracket arms 20 fixed to the casing, and provide either the mirror or the casing with lower bracket arms 21, secured to one and bearing against the other, so that the mirror may be tilted outwardly when desired to afford access to the illuminating agent or lamp 22, which in this instance is fitted within a socket 23 secured to the back of the casing, connections with a suitable source of supply of electricity being made in any preferred manner. It will be evident that with this construction the rays from the lamp 22 will be reflected through the surface 15 from all sides against the image which is to be reflected in the mirror. This form of the invention provides an artistic type of illuminated mirror for general purposes, which may be also used as an indirect illuminator by making the casing of glass or other transparent or translucent material.

In the form of my invention shown in Figs. 8 and 9, I have illustrated a mirror of square or other analogous form wherein the light rays are intended to be reflected from two of the opposite sides only of the mirror against the image which is to be reflected in the mirror. In this construction the mirror 24 is suitably mounted at the front of a casing 25 which if the mirror be hinged would allow casing 25 to be used as a storage compartment or cupboard for articles. The casing 25 is provided at its sides with compartments 26 in which are arranged electric lamps or other suitable light producing elements 27. The walls 28 of these compartments, which are open at the front, as shown at 29, form reflecting surfaces having angularly disposed marginal portions 28$^a$ corresponding to the reflectors 11 and 18 and their marginal portions 11$^a$ and 18$^a$, the inner walls of the front portions of the compartments being arranged to provide guards 30 which conceal the lamps and prevent the light rays from being thrown directly outward. The rays from the lamps are accordingly thrown against the reflectors 28—28$^a$ and by said reflectors projected through the openings 29 in the compartments against the image to be viewed. It will, of course, be understood that lamps may in this manner be arranged to throw the light from any number of sides of the mirror, leaving any number of sides darkened, according to the effects which it is desired to secure, but that with this construction the same soft and subdued light tones may be obtained as with the constructions disclosed in Figs. 1 to 7 inclusive, the source or sources of light being similarly concealed from the person whose image is to be reflected.

It will be observed, from the foregoing description, that my invention, in addition to producing an illuminating mirror in which the light rays are modified to secure a proper soft toned effect, also serves to provide a structure in which the lamp or source of light, irrespective of the correction of the light tones, is entirely concealed from view and is not itself reflected by any of the reflecting surfaces, and hence does not cast any false reflections, while at the same time the concealment of the source of light renders the lamp more pleasing and attractive. Furthermore, the construction described allows the surface 2 to be dispensed with, since the construction is such that the light rays will be reflected upon the object in a more pleasing and unobjectionable manner than is possible with the use of mirrors in which the source of light is either directly in view or brought into view by intermediate reflectors. Within the spirit and scope of the invention, the surface 2 may be dispensed with, although its use is greatly preferred and highly desirable, and the reflecting surface 11$^a$ or its equivalent made to serve to a greater or less degree as a light toning agent in its place.

I claim:—

1. A device of the character described comprising a mirror, and an illuminator forming with said mirror complemental parts of the device, said illuminator including a casing having a concealed source of light therein, a light transmitting surface of mat tint or color, and means for reflecting through said surface and from said concealed source a light so related in tone to the tone of said surface as to produce a soft, mellow light for reflection upon the object to be viewed in the mirror.

2. A device of the character described comprising a mirror, an associated light transmitting surface of a mat tone or color, a casing carrying said mirror and surface, and a lamp concealed within said casing and arranged to emit a light to be transmitted by said surface, said lamp being of a character to emit rays so related in tone to the color of the transmitting surface as to produce a soft, mellow light for reflection against the object to be viewed in the mirror.

3. A device of the character described comprising a mirror, a light transmitting or diffusing element associated therewith and having a mat tone or color, a casing supporting the mirror and light transmitting and diffusing element and provided with a reflecting surface, and a lamp concealed within said casing and provided with a bulb complemental in tone to the tone of the said light transmitting and diffusing element.

4. A device of the character described comprising a mirror, a light transmitting element of a mat color associated with the mirror, a transparent or translucent casing carrying said mirror and transmitting element, said casing being provided with a reflecting surface, and a lamp concealed within the casing and adapted to produce a light complemental in color tone to the transmitting element.

5. A device of the character described comprising a mirror having a reflecting surface at the back thereof, a transparent or translucent light transmitting surface surrounding the mirror, said surface being of mat color, a casing carrying the mirror and transmitting surface and provided with a reflecting surface opposite the back reflecting surfaces of the mirror, and a lamp arranged within the casing between said reflecting surfaces.

6. A device of the character described comprising a mirror, a casing carrying said mirror, a concealed source of light therein adapted to emit rays of a predetermined tone, and means disposed between marginal portions of the mirror and casing for transmitting said rays to the exterior of the casing and against the object to be viewed in the mirror, said transmitting means being of a character to modify or correct the light tone so as to produce a soft, mellow transmitted light.

7. A device of the character described comprising a casing, a mirror supported by the casing, light producing means arranged within the casing, and means for projecting the light from the casing against the object to be viewed in the mirror with a modified tonal effect.

8. A device of the character described comprising a casing, a hinged mirror forming a closure for an opening in said casing, a lamp concealed within the casing, and means for transmitting the light rays therefrom to the exterior of the casing against the object to be viewed in the mirror.

9. A device of the character described comprising a casing, a mirror at the front of the casing, reflecting means within the casing, means within the casing for producing a light of a certain tone, and means for transmitting the reflected light against the object to be viewed in the mirror with a modified tonal effect.

10. A device of the character described comprising the following combined elements, to wit:—a mirror, means for producing light rays of a determined tone from a source of light hidden within said device, and means for transmitting the light from said hidden source so as to fall upon an object to be viewed in the mirror with a modified tonal effect.

11. A device of the character described comprising the following combined elements, to wit:—a mirror, means for producing from a source hidden within said device a light having a determined tonal effect, and a surface for transmitting such light of a character to modify the rays thereof to give a correct tonal effect.

12. A device of the character described comprising a casing, a mirror supported by and at the front of the casing, illuminating means concealed within the casing, and means for transmitting the light therefrom against the object to be viewed in the mirror with a modified tonal effect.

13. A device of the character described comprising a casing, a mirror at the front of the casing, a reflecting surface within the casing and behind the mirror, a source of light within the casing between the mirror and reflector, and a transmitting surface through which the light from the casing is adapted to be transmitted.

14. A device of the character described comprising a casing, a mirror supported by and arranged at the front of the casing, a reflecting surface within the casing, a reflecting surface in rear of the mirror and in advance of the first-named reflecting surfaces, and a transparent or translucent light transmitting and diffusing surface through which the rays of light are to pass and be filtered so as to produce a light of soft, mellow tone for projection against the object to be viewed in the mirror.

15. A device of the character described comprising a mirror, a casing having a reflecting surface, a lamp concealed within the casing and adapted to produce a light of a determined color tone, and a light transmitting element of a mat color auxiliary to said reflecting surface and disposed for diffusing the reflected light against an object to be viewed in the mirror with a modified color tone effect.

16. A device of the character described comprising a mirror, a source of indirect light arranged behind the mirror so as to be invisible from in front of the mirror, and means arranged and operating to inclose and conceal such source of light and including a surface disposed at an angle to the plane of the mirror to intercept and project the light from said invisible source in advance of the mirror so as to fall upon an object to be viewed therein.

17. A device of the character described comprising a mirror, an illuminating device arranged behind the mirror, a casing receiving and inclosing said illuminating device and having a marginal portion surrounding the marginal portion of the mirror and spaced therefrom, said marginal portion of the casing providing a light intercepting and projecting surface disposed at an angle to the plane of the mirror to direct the light from all sides convergently at the front of the mirror and against an object to be viewed therein.

18. A device of the character described comprising a mirror, a reflecting surface upon the back of the mirror, a lamp arranged behind the mirror, and a casing inclosing the lamp and concealing the same from view, said casing having a concaved reflecting surface disposed opposite the first-named reflecting surface and projecting marginally beyond and surrounding the mirror so as to project the light around all sides of the mirror uniformly toward the object to be viewed therein.

19. A device of the character described comprising a mirror, a casing arranged behind the mirror and carrying the same, said casing being arranged to partly inclose the mirror, a lamp behind the mirror and concealed within the casing, said casing having a reflecting surface marginally surrounding the mirror and arranged to reflect the light rays without showing the source thereof from all sides of the mirror toward the object to be viewed therein.

20. A device of the character described comprising a mirror, a lamp arranged behind the mirror, a casing arranged to inclose and conceal said lamp and surrounding the marginal edges of the mirror at a distance therefrom to provide a light transmitting space between said mirror and the casing and connecting means between the casing and mirror extending across said space.

21. A device of the character described comprising a mirror, an illuminating device behind the mirror, a casing surrounding the marginal edges of the mirror at a distance therefrom to provide a light transmitting space between said edges and the casing, and a sheet of transparent or translucent material extending across said space.

22. A device of the character described comprising a casing having an open front, a mirror supported by the casing and arranged within the open front thereof, and a lamp disposed within the casing and behind the mirror, said mirror having its marginal edges spaced from the marginal edges of the casing to provide an intervening light transmitting space, said casing having a surface arranged at an angle to the plane of the mirror for intercepting and directing the rays of light from the lamp through said space against an object to be viewed in the mirror.

23. A device of the character described comprising a mirror, a source of light arranged behind the mirror, and a casing carrying said mirror and inclosing and concealing said source of light, said casing having a light projecting surface projecting laterally beyond and spaced from a margin of the mirror and disposed at an angle to the plane of the mirror so as to intercept and project the rays of light in advance of the mirror against an object to be viewed therein.

24. A device of the character described comprising a casing open at the front and having a concaved reflecting surface, a mirror supported by the casing and disposed within the open front thereof, said mirror having its marginal edges spaced from the marginal edges of the casing to provide an intervening light transmitting space, and having a reflecting surface upon the back thereof, and a lamp disposed within the casing and behind the mirror and between said reflecting surfaces, the marginal portion of the reflecting surface of the casing being disposed to direct the reflected rays from the lamp outward through said space to a point in advance of the mirror so as to fall upon an object to be viewed therein.

25. A device of the character described comprising a mirror, a lamp arranged behind the mirror so as to be concealed from the view of a person looking into the mirror, a casing carrying the mirror and inclosing the lamp, said casing having a marginal portion visible at the front of and extending around the mirror and spaced from the latter and disposed at a distance therefrom to provide an intervening light transmitting space, said marginal portion of the casing being arranged at an angle to the plane of the mirror and providing a projecting surface of a character to intercept and project the light rays against the face of a person looking into the mirror, and means disposed in the path of the light rays projected by said surface for modifying the tone thereof.

26. A device of the character described comprising a mirror, an illuminating device arranged behind the mirror, and a conical casing inclosing said illuminating device and having its rim portion marginally surrounding the mirror and spaced therefrom, said casing being provided with a convex reflecting surface and having its marginal portion arranged to provide a projecting surface for intercepting said rays from said reflecting surface and casting the same toward the front of the mirror against an object to be viewed in the mirror without showing said illuminating device.

In testimony whereof I affix my signature in presence of two witnesses.

WILFRED B. GODDARD.

Witnesses:
   DICK TYLER,
   ARTHUR E. SNOW.